Feb. 3, 1931. M. RIVKIN 1,790,768
LOCOMOTIVE ASH CONVEYER AND COLLECTOR
Filed June 20, 1930 2 Sheets-Sheet 1
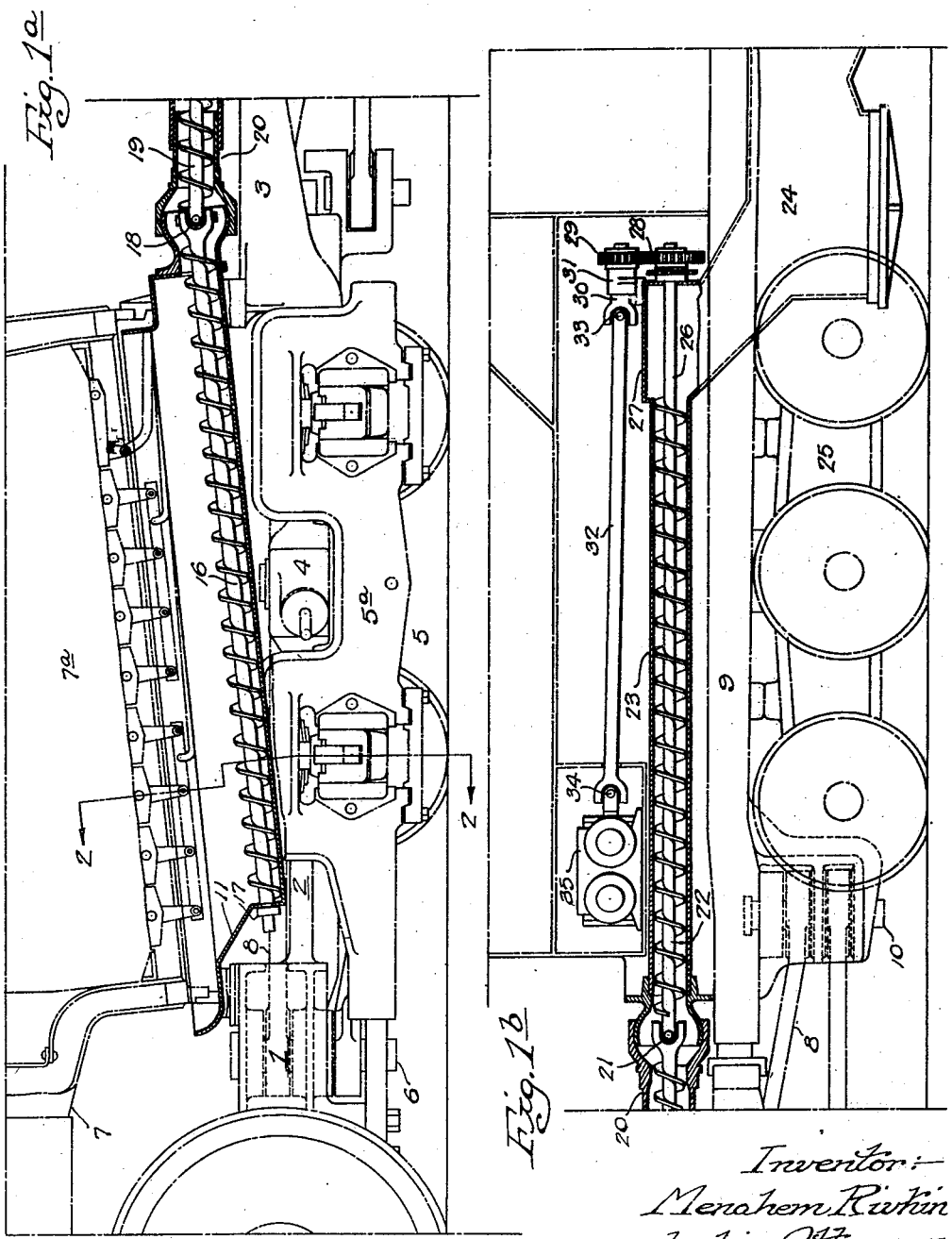
Inventor:
Menahem Rivkin
by his Attorneys
Howson & Howson Feb. 3, 1931.            M. RIVKIN                1,790,768
              LOCOMOTIVE ASH CONVEYER AND COLLECTOR
                   Filed June 20, 1930      2 Sheets-Sheet 2
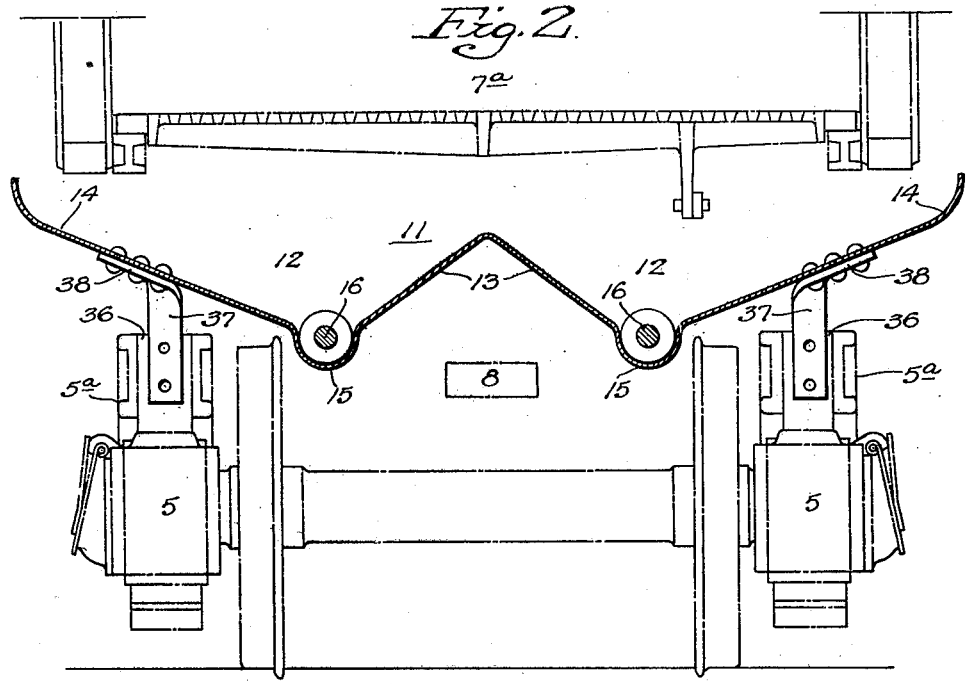
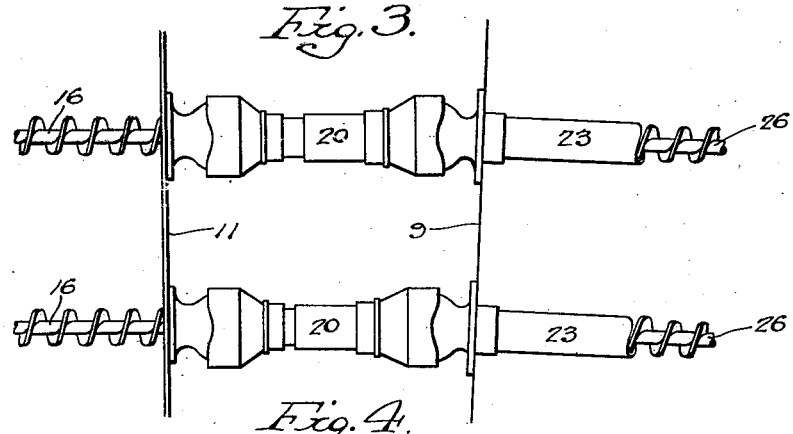
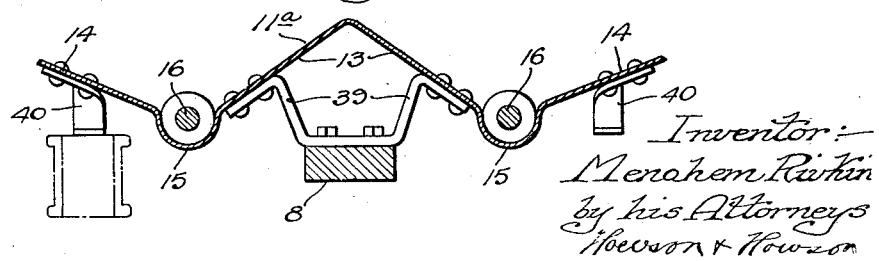
Inventor:
Menahem Rivkin
by his Attorneys
Hewson & Howson Patented Feb. 3, 1931

1,790,768

UNITED STATES PATENT OFFICE

MENAHEM RIVKIN, OF PHILADELPHIA, PENNSYLVANIA

LOCOMOTIVE ASH CONVEYER AND COLLECTOR

Application filed June 20, 1930. Serial No. 462,608.

The object of my invention is to provide a locomotive with means for conveying the ashes from under the fire box to a receptacle on the tender of the locomotive.

The invention also relates to certain details of construction which will be described hereinafter, reference being had to the accompanying drawings, in which:

Fig. 1a is a longitudinal sectional view through the ash pan of a locomotive, showing the pan and conveyer in full lines and other parts of the locomotive in dotted lines;

Fig. 1b is a longitudinal sectional view similar to Fig. 1a of sufficient of a tender to illustrate my invention, the conveyer and ash receptacle being shown in full lines and other parts of the tender being shown in dotted lines;

Fig. 2 is a transverse sectional view on the line 2—2, Fig. 1a;

Fig. 3 is a plan view illustrating the tubular conveyer connections between the locomotive and the tender and showing the universal joints; and Fig. 4 is a sectional view illustrating a modification of the method of securing the ash pan in position.

1 is the main frame of a locomotive having a rear end extension 2 formed integral with the foot plate 3 in the present instance and which has radial guides 4 for the truck 5, which is pivoted at 6 to the main frame of the locomotive. This construction is set forth and claimed in a companion application filed June 18, 1930, under Serial No. 462,009.

7 is the boiler of the locomotive having a fire box 7a of any suitable construction and may be either stoked by hand or by power mechanism. 8 is a draw bar which is coupled to the main frame at the pivot point 6 and extends to the tender 9 at the rear of the locomotive, being coupled thereto by a pivot pin 10. The construction of this draw bar also forms the subject of a separate application filed June 20, 1930, under Serial No. 462,610.

11 is the ash pan located under the fire box 7a of the locomotive, as shown in full lines in Fig. 1a and this ash pan is preferably made double as shown in Fig. 2, having two hoppers 12 formed by the inclined center plates 13 and the inclined outer plates 14. The ash pan is formed with two conveyer troughs 15 which extend from one end of the ash pan to the other and in each trough is a screw conveyer 16, the forward end of the conveyer being mounted in bearings 17 secured to the ash pan and the opposite end being connected by a universal joint 18 to a short conveyer section 19 within a tubular connecting member 20. The short conveyer is connected by a universal joint 21 to a conveyer 22 within a tubular conveyer trough 23 on the tender of the locomotive. The trough communicates with an ash receptacle or collector 24 hung from the tender between the trucks 25, although it may be located at any convenient point.

The shaft 26 of the conveyer 22 extends to the rear of the casing 27 and has its bearings therein and this shaft has a gear wheel 28 thereon which meshes with the pinion 29 on a driving member 30 mounted in a bearing 31 secured to the casing 27. In the present instance this driving member is driven through a shaft 32 and universal joints 33 and 34 from an engine 35 mounted at the forward end of the locomotive tender, although the engine may be located at any other convenient point according to the type and the particular construction of the tender. The engine may be an independent engine for driving only the ash conveyer, but in some instances where a stoking mechanism is used the engine which drives the stoker may be used for driving the ash conveyer.

In Fig. 2 the ash pan 11 is carried by the truck 5. The frame 5a of the truck has a transverse web 36 to which an upright 37 is secured, and this upright is bent as at 38 to fit against the underside of the inclined portion 14—14 of the pan and is securely riveted thereto and bolted to the truck so that the ash pan will swing with the truck from the truck pivot 6. The pan is of sufficient width to allow for the lateral movement.

In Fig. 4 the ash pan 11a is secured to the draw bar 8. In the present instance attached to the draw bar are bars 39 which are bent to fit against the portions 13 of the pan and are secured thereto by pivots. At each side of the pan are supports 40 which rest upon the truck frame but are not attached thereto, so that in this case the ash pan moves laterally with the draw bar.

While I have illustrated my invention in connection with a screw-conveyer for carrying the ashes from the ash pan to the ash receptacle 24, other types of conveyers may be used without departing from the essential features of the invention.

I claim:

1. The combination in a locomotive, of a frame; a boiler having a fire box mounted on the frame; an ash pan located under the fire box end of the boiler; a tender; an ash receptacle on the tender; and means for conveying ashes from the ash pan to the receptacle on the tender.

2. The combination in a locomotive, of a main frame; a boiler mounted on said frame, said boiler having a fire box at the rear end; an ash pan located under the fire box; a tender; an ash receptacle located on the tender; a connecting member having universal joints with which it is connected to the ash pan and to the tender; and a conveyer located at the bottom of the ash pan and extending through the connection and its universal joints and into the tender and arranged to carry ashes from the ash pan and discharge them into the ash receptacle.

3. The combination in a locomotive, of a main frame; a boiler mounted on said frame, said boiler having a fire box at the rear end; an ash pan located under the fire box; a tender; an ash receptacle located on the tender; a connecting member having universal joints with which it is connected to the ash pan and to the tender; and a conveyer located at the bottom of the ash pan and extending through the connection and its universal joints and into the tender and arranged to carry ashes from the ash pan and discharge them into the ash receptacle; and means on the tender for driving the conveyer.

4. The combination in a locomotive, of a frame; a boiler mounted on the frame and having a fire box; a rear truck pivoted to the frame; an ash pan mounted under the fire box and carried by the truck; a tender; an ash receptacle in the tender; and conveying means for conveying the ashes from the ash pan to the ash receptacle on the tender.

5. The combination in a locomotive, of a frame; a boiler mounted on the frame, said boiler having a fire box; a rear swing truck pivoted to the rear frame; a rear end extension on the frame carrying a draw head and foot plate; an ash pan mounted on the truck and located under the fire box of the boiler, the bottom of the ash pan being in the form of a trough; a screw-conveyer in the trough; an ash receptacle on the tender; a tubular shell mounted on the tender; a screw-conveyer in said tubular shell and means for driving the conveyer; a tubular connecting member between the locomotive and the tender; universal joints connecting said member with the tender and with the ash pan structure on the locomotive; and a screw-conveying section within said tubular section having a universal joint at each end, one end being connected to the tender and the other connected to the conveyer in the ash pan.

6. The combination in a locomotive, of a frame; a boiler mounted on the frame and having a fire-box; a rear truck pivoted to the frame; an ash pan mounted under the fire-box; a draw bar pivoted to the frame; and means for securing the ash pan to the draw bar.

7. The combination in a locomotive, of a frame; a boiler mounted on the frame and having a fire-box; a rear truck pivoted to the frame; an ash pan mounted under the fire-box; a draw bar pivoted to the frame; means for securing the ash pan to the draw bar; and side supports on the ash pan arranged to rest upon the truck.

8. The combination in a locomotive, of a frame; a boiler mounted on the frame and having a fire-box; a rear truck pivoted to the frame at the forward end of the fire-box; a draw bar also pivoted at this point; and an ash pan mounted under the fire-box and supported by the truck and movable with the draw bar.

MENAHEM RIVKIN.